United States Patent
Sahinoglu et al.

(10) Patent No.: US 8,907,841 B2
(45) Date of Patent: Dec. 9, 2014

(54) METHOD FOR DETECTING TARGETS USING SPACE-TIME ADAPTIVE PROCESSING

(75) Inventors: Zafer Sahinoglu, Cambridge, MA (US); Man-On Pun, Jersey City, NJ (US); Pu Wang, Ridgefield, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 530 days.

(21) Appl. No.: 13/291,323

(22) Filed: Nov. 8, 2011

(65) Prior Publication Data

US 2012/0249361 A1  Oct. 4, 2012

Related U.S. Application Data

(60) Provisional application No. 61/471,407, filed on Apr. 4, 2011.

(51) Int. Cl.
| | | |
|---|---|---|
| *G01S 13/50* | (2006.01) | |
| *G01S 13/524* | (2006.01) | |
| *G01S 7/292* | (2006.01) | |
| *G01S 13/02* | (2006.01) | |

(52) U.S. Cl.
CPC .............. *G01S 7/292* (2013.01); *G01S 13/5244* (2013.01); *G01S 2013/0245* (2013.01)

USPC ............................ 342/159; 342/160; 342/175

(58) Field of Classification Search
CPC .................................................. G01S 13/5244
USPC ..................................................... 342/159, 162
See application file for complete search history.

(56) References Cited

U.S. PATENT DOCUMENTS

| | | | | |
|---|---|---|---|---|
| 6,040,797 A | * | 3/2000 | Hofele | 342/159 |
| 6,518,914 B1 | * | 2/2003 | Peterson et al. | 342/25 R |
| 7,212,150 B2 | * | 5/2007 | Blunt et al. | 342/91 |
| 2005/0237236 A1 | * | 10/2005 | Budic | 342/159 |
| 2006/0238408 A1 | * | 10/2006 | Blunt et al. | 342/91 |

* cited by examiner

*Primary Examiner* — John B Sotomayor
*Assistant Examiner* — Marcus Windrich
(74) *Attorney, Agent, or Firm* — Dirk Brinkman; Gene Vinokur

(57) ABSTRACT

A method for detecting a target in a non-homogeneous environment using a space-time adaptive processing of a radar signal includes normalizing training data of the non-homogeneous environment to produce normalized training data; determining a normalized sample covariance matrix representing the normalized training data; tracking a subspace represented by the normalized sample covariance matrix to produce a clutter subspace matrix; determining a test statistic representing a likelihood of a presence of the target in the radar signal based on the clutter subspace matrix and a steering vector; and comparing the test statistic with a threshold to detect the target.

6 Claims, 2 Drawing Sheets

200

METHOD FOR DETECTING TARGETS USING SPACE-TIME ADAPTIVE PROCESSING

RELATED APPLICATION

This Patent Application claims priority to Provisional Application 61/471,407, "Method for Detecting Targets Using Space-Time Adaptive Processing," filed by Pun et al. on Apr. 4, 2011, incorporated herein by reference.

FIELD OF THE INVENTION

This invention relates generally to signal processing, and in particular to space-time adaptive processing (STAP) for detecting a target using radar signals.

BACKGROUND OF THE INVENTION

Space-time adaptive processing (STAP) is frequently used in radar systems to detect a target, e.g., a car, or a plane. STAP has been known since the early 1970's. In airborne radar systems, STAP improves target detection when interference in an environment, e.g., ground clutter and jamming, is a problem. STAP can achieve order-of-magnitude sensitivity improvements in target detection.

Typically, STAP involves a two-dimensional filtering technique applied to signals acquired by a phased-array antenna with multiple spatial channels. Generally, the STAP is a combination of the multiple spatial channels with time dependent pulse-Doppler waveforms. By applying statistics of interference of the environment, a space-time adaptive weight vector is formed. Then, the weight vector is applied to the coherent signals received by the radar to detect the target.

A number of non-adaptive and adaptive STAP detectors are available for detecting moving targets in non-Gaussian distributed environments. Due to the additional time-correlated texture component, the optimum detection in the compound-Gaussian yields an implicit form, in most cases. The solution to the optimum detector usually resorts to an expectation-maximization procedure. On the other hand, sub-optimal detectors in the compound-Gaussian case are expressed in closed-form. Among these detectors are the normalized adaptive matched filter (NAMF) with the standard sample covariance matrix, and the NAMF with the normalized sample covariance matrix.

Speckle in a compound-Gaussian distributed environment has a low-rank structure. A speckle pattern is a random intensity pattern produced by mutual interference of a set of wavefronts. Therefore, an adaptive eigen value/singular-value decomposition (EVD/SVD) is used, where, instead of using the inverse of the sample covariance matrix, a projection of the received signal and steering vector into the null space of the clutter subspace is used to obtain the detection statistics. The EVD/SVD—based method is able to reduce the training requirement to O(2r), where r is the rank of the disturbance covariance matrix. However, the computational complexity of this method remains high as $O(M^3N^3)$, where M is the number of spatial channels and N is the number of pulses. If MN becomes large, then the high computational complexity of the EVD/SVD—based methods are impractical for real-time applications.

FIG. 1 shows a block diagram of the conventional STAP method. When no target is detected, acquired signals 101 include a test signal $x_0$ 110 and a set of training signals $X_k$ k=1, 2, ..., K, 120, wherein K is a total number of training signals, which are independent and identically distributed (i.i.d.). The target signal can be expressed as a product of a known steering vector s 130 and unknown amplitude α.

That method normalizes 140 the training signals $x_k$ 120, and then computes the normalized sample covariance matrix 150 using the normalized training data 140. Then, eigenvalue decomposition 160 is applied to the normalized sample covariance matrix 150 to produce a matrix U 165 representing the clutter subspace. Next, the method determines a test statistics 170 describing a likelihood of presence of the target in a test signal 110 as shown in (1).

$$T_{prior\_art} = \frac{|s^H(I - UU^H)x_0|^2}{(s^H(I - UU^H)s)(x_0^H(I - UU^H)x_0^H)}, \qquad (1)$$

where s is a known steering vector for a particular Doppler frequency and angle of arrival, I is an identity matrix, $x_0$ is the data vector to be tested for target presence, and H is the Hermitian transpose operation.

The resulting test statistic $T_{prior\_art}$ 170 is compared to a threshold 180 to detect 190 whether a target is present, or not.

The EVD/SVD based STAP method works well for compound-Gaussian distributed, i.e., non-homogeneous environments. However, this method is computationally expensive. Accordingly there is a need in the art to provide a low complexity STAP method for detecting a target in non-homogeneous environments

SUMMARY OF THE INVENTION

The embodiments of the invention provide a system and a method for detecting targets in radar signals using space-time adaptive processing (STAP). To address high complexity of the adaptive eigen value/singular-value decomposition (EVD/SVD) based clutter subspace estimation, some embodiments uses a subspace tracking (ST) method.

Accordingly, some embodiments use a low-complexity STAP strategy via subspace tracking in non-homogeneous compound-Gaussian distributed environments. Specifically, various embodiments use ST-based low-complexity STAP detectors to track the subspace of a speckle component and mitigate the effect of the time-varying texture component.

The ST-based STAP for compound-Gaussian etc. environments is training-efficient, due to its exploitation of the low-rank structure of the speckle component. Also, ST-based STAP method is computationally more efficient than SVD/EVD—based subspace approaches, due to its tracking subspace ability.

Accordingly, one embodiment of the invention provides a method for detecting a target in a non-homogeneous environment using a space-time adaptive processing of a radar signal. The method includes normalizing training data of the non-homogeneous environment to produce normalized training data; determining a normalized sample covariance matrix representing the normalized training data; tracking a subspace represented by the normalized sample covariance matrix to produce a clutter subspace matrix; determining a test statistic representing a likelihood of a presence of the target in the radar signal based on the clutter subspace matrix and a steering vector; and comparing the test statistic with a threshold to detect the target.

The normalized sample covariance matrix can be determined according to a sub-space tracking method, wherein a method for the clutter subspace tracking can be selected from a group including projection approximation subspace tracker (PAST), orthogonal projection approximation subspace tracker (OPAST), projection approximation subspace tracker with deflation (PASTd), fast approximate power iteration (FAPI), and modified fast approximate power iteration (MFAPI).

Another embodiment discloses a method for detecting a target in a non-homogeneous environment using a space-time adaptive processing of a radar signal. The method includes normalizing training data according to $$\tilde{x}_k = \frac{x_k}{\sqrt{x_k^H x_k / K}},$$

to produce normalized training data; determining a normalized sample covariance matrix representing the normalized training data according to $$\tilde{R} = \frac{1}{K} \sum_{k=1}^{K} \tilde{x}_k \tilde{x}_k^H;$$

tracking a subspace represented by the normalized sample covariance matrix uses a clutter subspace tracking according to $$\tilde{R} = \tilde{U}_{MN \times r} \lambda_{r \times r} \tilde{U}_{MN \times r}^H + I\sigma_n^2$$

to produce a clutter subspace matrix U; determining a test statistic representing a likelihood of a presence of the target in the radar signal based on the clutter subspace matrix and a steering vector according to $$T_{invention} = \frac{|s^H(I - \tilde{U}\tilde{U}^H)x_0|^2}{(s^H(I - \tilde{U}\tilde{U}^H)s)(x_0^H(I - \tilde{U}\tilde{U}^H)x_0^H)};$$

and comparing the test statistic with a threshold to detect the target, wherein $\tilde{R}$ is a normalized sample covariance matrix, $\lambda_{r \times r}$ is a diagonal matrix with most important r eigenvalues of the clutter subspace along the diagonal, $\sigma_n^2$ is a noise variance, I is an identity matrix, $\tilde{U}_{MN \times r}$ is an estimated clutter subspace, $x_0$ is a target data vector under a test for target presence, s is a steering vector for a given Doppler and angle of arrival.

Yet another embodiment discloses a system for detecting a target in a radar signal of a non-homogeneous environment using a space-time adaptive processing. The system includes a phased-array antenna with multiple spatial channels for acquiring training data; a processor for normalizing the training data and for determining a normalized sample covariance matrix representing the normalized training data; and a tracking subspace estimator for tracking the normalized sample covariance matrix to produce a clutter subspace matrix, wherein the processor determines a test statistic representing a likelihood of a presence of the target in the radar signal based on the clutter subspace matrix and a steering vector and compares the test statistic with a threshold to detect the target.

DETAILED DESCRIPTION OF THE PREFERRED EMBODIMENTS

Figure 1:
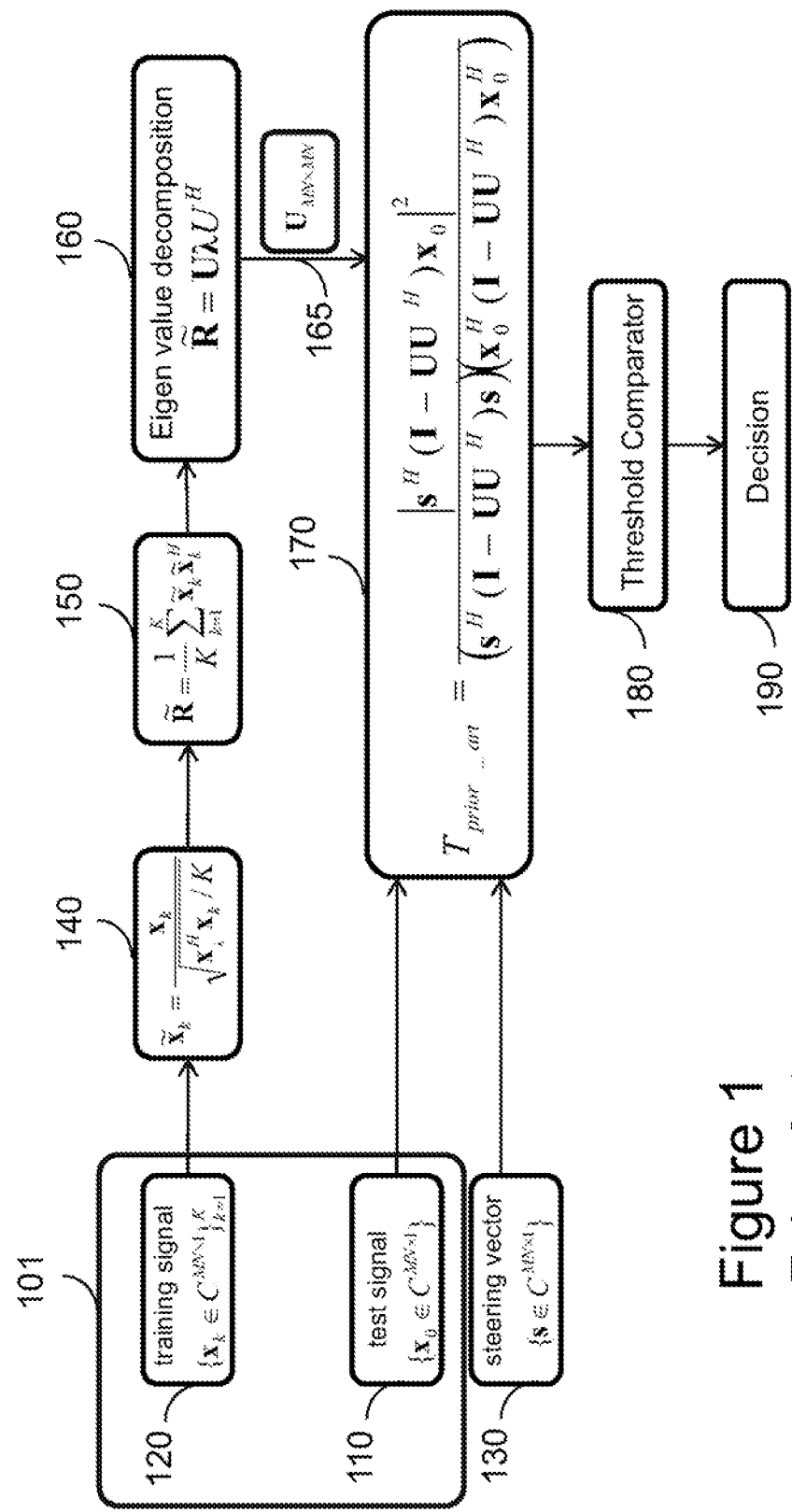
FIG. 1 is a block diagram of prior art space-time adaptive processing (STAP) for detecting targets.
Figure 2:
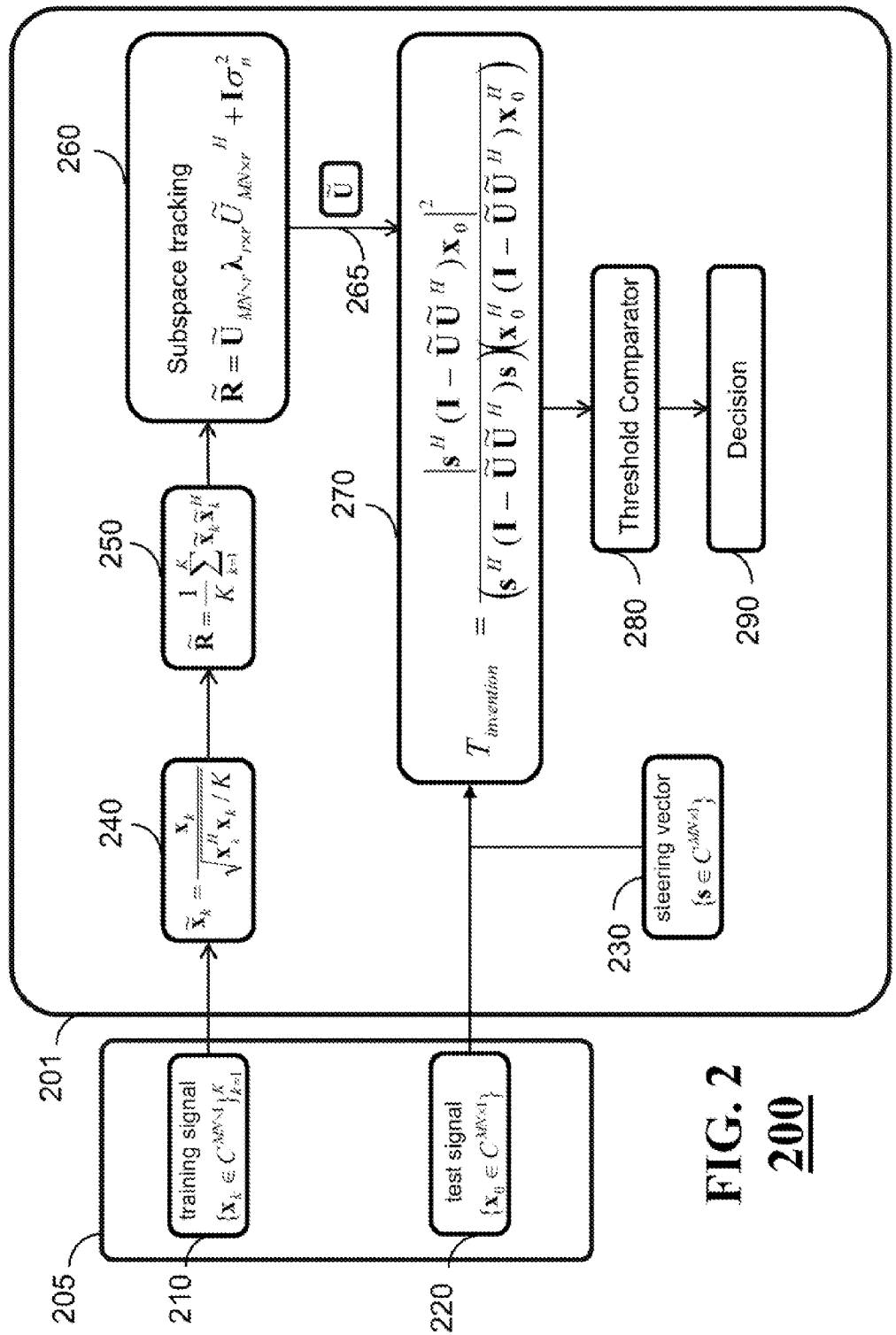
FIG. 2 is a block diagram of a system and a method of STAP method via subspace tracking according to some embodiments of an invention.

FIG. 2 shows a block diagram of a system and a method for detecting a target in a non-homogeneous environment using space-time adaptive processing of a radar signal. In one embodiment, the system includes a phased-array antenna 205 for acquiring normalizing training data via multiple spatial channels, and a processor 201 for normalizing 240 the training data and for determining 250 a normalized sample covariance matrix representing the normalized training data. Also, the system includes a tracking subspace estimator 260 for tracking the normalized sample covariance matrix to produce a clutter subspace matrix 265. The tracking subspace estimator can be implemented using the processor 201 or an equivalent external processor. Also, the processor determines 270 a test statistic representing a likelihood of a presence of the target in the radar signal based on the clutter subspace matrix and a steering vector 230 and compares 280 the test statistic with a threshold to detect 290 the target.

Various embodiments of the invention use a low-rank structure of a speckle covariance matrix to simplify its tracking by some subspace tracking technique. Some embodiments are based on a realization that direct application of the subspace tracking (ST) to the compound-Gaussian distributed environment fails to take into account the power oscillation over range bins. To address this problem, normalization at the training signal level and at the test statistic level are described to adapt the ST to the compound-Gaussian environment. Specifically, the subspace tracking based low complexity STAP uses test signal $\{x_0 \in C^{MN \times 1}\}$ 220 and training signals $\{x_k \in C^{MN \times 1}\}_{k=1}^{K}$ 210 and the steering vector $\{s \in C^{MN \times 1}\}$ 230 as inputs.

The compound-Gaussian clutter is a product of a positive scalar $\lambda_k$ and a multi-dimensional complex Gaussian vector with mean zero and covariance matrix R as in (2)

$$X_k = \lambda_k z_k \in C^{MN \times 1} \qquad (2)$$

where $z_k \sim CN(0, R)$. The conditional distribution of $x_k$ is $x_k|\gamma_k \sim CN(0, \gamma_k R)$, which implies power oscillations over range bins.

Because the clutter data have different powers over range bins, a normalization of the clutter data is preferred for precisely tracking the subspace R. One simple solution is to perform instantaneous power normalization of the clutter data before applying the ST techniques as $$\tilde{x}_k = \frac{x_k}{\sqrt{x_k^H x_k / K}} \; 240.$$

Then, a normalized sample covariance matrix 250 is computed using the normalized training data 240. The clutter subspace estimator 260 can use various methods such as projection approximation subspace tracker (PAST), orthogonal projection approximation subspace tracker (OPAST), projection approximation subspace tracker with deflation (PASTd), fast approximate power iteration (FAPI), and modified fast approximate power iteration (MFAPI).

Accordingly, one embodiment uses a normalized ST-based STAP detector 270 according to $$T_{invention} = \frac{|s^H(I - \tilde{U}\tilde{U}^H)x_0|^2}{(s^H(I - \tilde{U}\tilde{U}^H)s)(x_0^H(I - \tilde{U}\tilde{U}^H)x_0^H)} \quad (2)$$

where $\tilde{U}$ 265 is the estimated clutter subspace from the instantaneously normalized signals 240 and 250, using some subspace tracking techniques 260. The test statistic 270 is used for testing whether a target is presence. The resulting test statistic $T_{invention}$ 270 is compared to a threshold 280 to detect 290 whether a target is present, or not.

Accordingly, a method for detecting a target in a non-homogeneous environment using a space-time adaptive processing of a radar signal, can include normalizing training data of the non-homogeneous environment to produce normalized training data; determining a normalized sample covariance matrix representing the normalized training data; tracking a subspace represented by the normalized sample covariance matrix to produce a clutter subspace matrix; determining a test statistic representing a likelihood of a presence of the target in the radar signal based on the clutter subspace matrix and a steering vector; and comparing the test statistic with a threshold to detect the target.

For example, in one embodiment the method includes normalizing 240 training data according to $$\tilde{x}_k = \frac{x_k}{\sqrt{x_k^H x_k / K}},$$

to produce normalized training data; determining 250 a normalized sample covariance matrix representing the normalized training data according to $$\tilde{R} = \frac{1}{K}\sum_{k=1}^{K} \tilde{x}_k \tilde{x}_k^H;$$

tracking 260 a subspace represented by the normalized sample covariance matrix uses a clutter subspace tracking according to
$\tilde{R} = \tilde{U}_{MN\times r} \lambda_{r\times r} \tilde{U}_{MN\times r}^H + I\sigma_n^2$ to produce a clutter subspace matrix U 265; determining 270 a test statistic representing a likelihood of a presence of the target in the radar signal based on the clutter subspace matrix and a steering vector according to $$T_{invention} = \frac{|s^H(I - \tilde{U}\tilde{U}^H)x_0|^2}{(s^H(I - \tilde{U}\tilde{U}^H)s)(x_0^H(I - \tilde{U}\tilde{U}^H)x_0^H)};$$

and comparing 280 the test statistic with a threshold to detect 290 the target, wherein $\tilde{R}$ is a normalized sample covariance matrix, $\lambda_{r\times r}$ is a diagonal matrix with most important r eigenvalues of the clutter subspace along the diagonal, $\sigma_n^2$ is a noise variance, I is an identity matrix, $\tilde{U}_{MN\times r}$ is an estimated clutter subspace, $x_0$ is a target data vector under a test for target presence, s is a steering vector for a given Doppler frequency and angle of arrival.

EFFECT OF THE INVENTION

The embodiments of the invention provide a method for detecting targets. A low complexity STAP via subspace tracking is provided for compound Gaussian distributed environment, which models the power oscillation between the test and the training signals.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Although the invention has been described by way of exes of preferred embodiments, it is to be understood that various other adaptations and modifications may be made within the spirit and scope of the invention. Therefore, it is the object of the appended claims to cover all such variations and modifications as come within the true spirit and scope of the invention.

We claim:
1. A method for detecting a target in a non-homogeneous environment using space-time adaptive processing of a radar signal, comprising the steps of:
normalizing training data of the non-homogeneous environment to produce normalized training data, wherein the normalizing is according to

$$\tilde{x}_k = \frac{x_k}{\sqrt{x_k^H x_k / K}},$$

wherein $x_k$ is a $k^{th}$ training vector, K is a total number of training vectors, H is a Hermitian transpose operation, $\tilde{x}_k$ is a $k^{th}$ normalized training data vector;
representing the normalized training data as a normalized sample covariance matrix, wherein the normalized sample covariance matrix $\tilde{R}$ is determined based on a sub-space tracking method according to $$\tilde{R} = \frac{1}{K}\sum_{k=1}^{K} \tilde{x}_k \tilde{x}_k^H;$$

tracking a subspace represented by the normalized, sample covariance matrix to produce a clutter subspace matrix, wherein the sub-space tracking uses a clutter subspace tracking according to $\tilde{R} = \tilde{U}_{MN\times r} \lambda_{r\times r} \tilde{U}_{MN\times r}^H + I\sigma_n^2$, wherein $\lambda_{r\times r}$ is a diagonal matrix with most important r eigenvalues of the clutter subspace along the diagonal, $\sigma_n^2$ is a noise variance, I is an identity matrix, $\tilde{U}_{MN\times r}$ is the clutter subspace matrix, M is the number of antenna elements, N is the number of pulses and r is a rank of estimated the clutter subspace covariance matrix;

determining a test statistic representing a likelihood of a presence of the target in the radar signal based on the clutter subspace matrix and a steering vector; and comparing the test statistic with a threshold detect the target, wherein the steps are performed by a processor.

2. The method of claim 1, wherein the normalized sample covariance matrix is determined according to a sub-space tracking method.

3. The method of claim 1, wherein a method for the clutter subspace tracking is selected from a group including a projection approximation subspace tracker (PAST), an orthogonal projection approximation subspace tracker (OPAST), a projection approximation subspace tracker with deflation (PASTd), a fast approximate power iteration (FAPI), and a modified fast approximate power iteration (MFAPI).

4. The method of claim 1, further comprising: determining the test statistic according to $$T_{invention} = \frac{|s^H(I - \tilde{U}\tilde{U}^H)x_0|^2}{(s^H(I - \tilde{U}\tilde{U}^H)s)(x_0^H(I - \tilde{U}\tilde{U}^H)x_0^H)},$$

wherein $x_0$ is a data vector to be tested for a presence of a target, s is a steering vector for a given Doppler frequency and angle of arrival.

5. The method of claim 1, further comprising:
acquiring the training data of the non-homogeneous environment using a phased-array antenna.

6. The method of claim 1, wherein the clutter is compound Gaussian distributed.

* * * * *